United States Patent
Chiang

(12) United States Patent (10) Patent No.: US 7,650,067 B2
Chiang (45) Date of Patent: Jan. 19, 2010

(54) LENS MODULE WITH FOCUSING MECHANISM

(75) Inventor: Tsung-Wei Chiang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 437 days.

(21) Appl. No.: 11/556,112

(22) Filed: Nov. 2, 2006

(65) Prior Publication Data
US 2007/0196094 A1 Aug. 23, 2007

(30) Foreign Application Priority Data
Feb. 17, 2006 (CN) .................. 2006 1 0033839

(51) Int. Cl.
G02B 7/04 (2006.01)
G02B 7/02 (2006.01)
G03B 17/00 (2006.01)
G03B 17/02 (2006.01)
G03B 13/18 (2006.01)
G03B 13/32 (2006.01)

(52) U.S. Cl. .................. 396/144; 359/819; 359/822; 359/823; 359/825; 359/694; 348/345; 348/373; 348/374

(58) Field of Classification Search .................. 396/72, 396/79–80, 82–83, 85–87, 144–146; 359/694–701, 359/822–823, 825–826, 811, 819; 348/373–374, 348/345
See application file for complete search history.

(56) References Cited

U.S. PATENT DOCUMENTS 5,052,781 A * 10/1991 Iizuka .................. 359/823
7,127,162 B2 * 10/2006 Mano .................. 396/144
7,469,100 B2 * 12/2008 Toor et al. .................. 396/144

FOREIGN PATENT DOCUMENTS

CN 92104988.9 6/1992
CN 2636263 Y 8/2004

OTHER PUBLICATIONS

Jiang et al, English Translation of CN 2636263, Aug. 2004.*

* cited by examiner

*Primary Examiner*—Bot L LeDynh
(74) *Attorney, Agent, or Firm*—Steven M. Reiss

(57) ABSTRACT

An exemplary lens module (30) includes a lens barrel (31), a focusing mechanism (40), a resilient member (70), and a bottom seat (50). The lens barrel is mounted with at least one lens (36) therein and is fixed to one end of the focusing mechanism. One end of the resilient member resists the focusing mechanism and the other opposite end of the resilient member resists the bottom seat. The focusing mechanism is for controlling an amount of expansion permitted within the resilient member. The amount of expansion of the resilient member determines a degree of focus achieved by the lens module.

10 Claims, 3 Drawing Sheets

LENS MODULE WITH FOCUSING MECHANISM

BACKGROUND OF THE INVENTION

1. Field of the Invention

The present invention generally relates to lens modules and, more particularly, to a lens module with a focusing mechanism configured (i.e., structured and arranged) for use in an optical device, such as a microscope, a camera module, a digital camera module used in a portable electronic device, or the like.

2. Description of Related Art

With the ongoing development of microcircuitry and multimedia technologies, digital cameras are now in widespread use. High-end portable electronic devices, such as mobile phones and personal digital assistants (PDAs), are being developed to be increasingly multi-functional. Many of these portable electronic devices are now equipped with a digital camera module. These electronic devices enable consumers to enjoy capturing digital pictures anytime and anywhere. At the same time, the need/desire for improved digital picture quality has increased.

In a typical camera module, a lens module is very important to the quality of the pictures captured by the camera module. Generally, a camera module includes at least one lens and an image sensing module. Optical image signals are focused by the at least one lens onto the image sensing module. The image sensing module transforms the optical image signals into electronic image signals. When a distance between the at least one lens and the image sensing module is adjusted, the definition of the optical image signals received by the image sensing module is also changed. Focusing mechanisms are widely used in lens modules for taking high quality photos.

In a typical lens module with a focusing mechanism, the focusing mechanism generally includes some driving elements, such as gearings and/or motors. When the lens module is used to take photos, the focusing mechanism adjusts some optical components, such as the at least one lens and/or the image sensing module, to an appropriate position via the drivers. However, the focusing mechanism is likely to undergo wear and tear because of continual friction between the driving elements, and the precision of the focusing mechanism can be reduced over time due to such wear.

Therefore, a new lens/camera module is desired in order to overcome the above-described shortcomings.

SUMMARY

In one embodiment thereof, a lens module includes a lens barrel, a focusing mechanism, a resilient member, and a bottom seat. The lens barrel is mounted with at least one lens therein and is fixed to one end of the focusing mechanism. One end of the resilient member resists the focusing mechanism and the other opposite end of the resilient member resists the bottom seat. The focusing mechanism is configured for controlling an amount of expansion permitted within the resilient member. The amount of expansion of the resilient member determines a degree of focus achieved by the lens module.

Other advantages and novel features of the embodiments will become more apparent from the following detailed description thereof when taken in conjunction with the accompanying drawings.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the lens module and its potential applications. Moreover, in the drawings, like reference numerals designate corresponding parts throughout the several views.

DETAILED DESCRIPTION OF THE EMBODIMENTS

Figure 1:
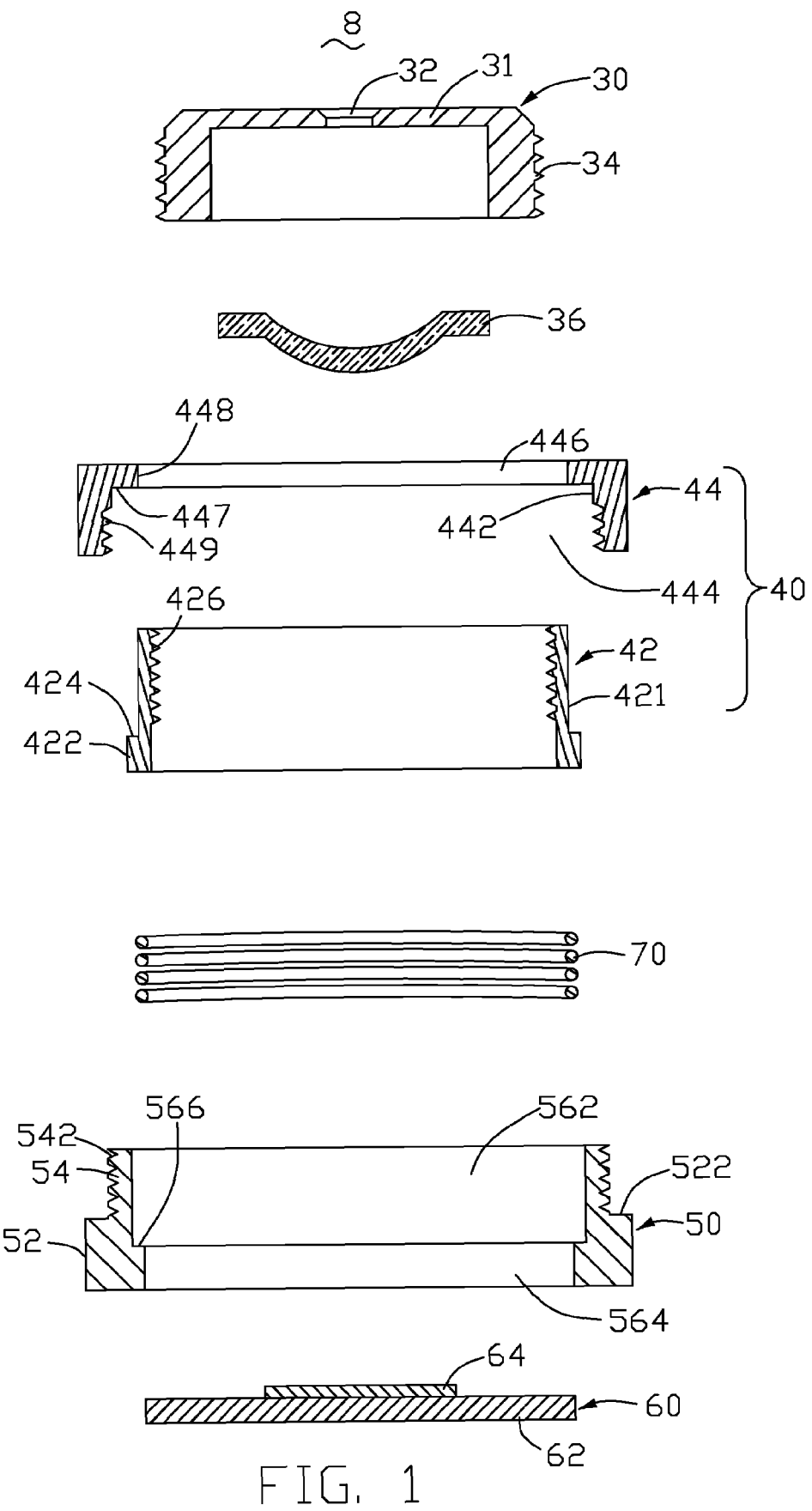
FIG. 1 is an exploded, cut-away view of a camera module having a lens module with a focusing mechanism, in accordance with a preferred embodiment.

Referring now to the drawings in detail, FIG. 1 shows a camera module 8 of a preferred embodiment. The camera module 8 includes a lens module 30 with a focusing mechanism 40; and an image sensing module 60. The lens module 30, in the illustrated embodiment, is configured and, thus, used to concentrate image light traveling incident to the lens module 30 onto the image sensing module 60 to facilitate a capture of an image. While the lens module 30 is shown incorporated into the camera module 8, it is to be understood that the lens module 30 or obvious variations thereof may prove useful in other work environments (e.g., a microscope).

The lens module 30 includes a lens barrel 31, a focusing mechanism 40, a resilient member 70, and a bottom seat 50. The lens barrel 31 is mounted with at least one lens 36 therein. The lens barrel 31 is fixed to one end of the focusing mechanism 40. The focusing mechanism 40 is movable relative to the bottom seat 50 and thereby configured for permitting/facilitating a change in a position of the lens 36 relative to the bottom seat 50.

The lens barrel 31 is substantially cylindrical in shape and has a half-closed end and an open end. The half-closed end defines an opening 32 in a center thereof. A first outer screw thread 34 is directly formed on a periphery of the lens barrel 31. The lens 36 is mounted in the lens barrel 31 through the open end.

The focusing mechanism 40 includes a sleeve 42 and an adjusting ring 44 configured for controlling a degree of expansion permitted within the resilient member 70. The sleeve 42 is substantially cylindrical in shape and has a main outer surface 421. A stage 422 is formed at one end of the main outer surface 421, extending outwardly therefrom. The stage 422 is ring-shaped and has a stage surface 424. The stage surface 424 is, in particular, substantially perpendicular to the main outer surface 421. A first inner screw thread 426 is formed on (i.e., directly within) an inner wall of the sleeve 42. The first inner screw thread 426 is configured for engaging with the first outer screw thread 34 of the lens barrel 31 so that the lens barrel 31 threadingly engages within the sleeve 42, upon assembly.

The adjusting ring 44 is substantially cylindrical in shape. The adjusting ring 44 has an open end and a half-closed end. The open end thereof has a first inner ring surface 442, the first inner ring surface 442 defining a first hole 444 extending through the open end. The half-closed end of the adjusting ring 44 includes a resisting surface 447 and a second inner ring surface 448. The second inner ring surface 448 of the half-closed end defines a second hole 446 in a center thereof. The first hole 444 communicates with the second hole 446. A diameter of the second hole 446 is less than a diameter of the first hole 444. The resisting surface 447 extends inwardly from the inner ring surface 442, substantially perpendicular thereto, and is orthogonal to the second inner ring surface 448. As such, the resisting surface 447 is, effectively, located between the first hole 444 and the second hole 446. A second inner screw thread 449 is formed directly in the inner ring surface 442 of the adjusting ring 44.

The diameter of the first hole 444 is larger than an outer diameter of the stage 422 of the sleeve 42. The diameter of the second hole 446 is larger than an outer diameter of the sleeve 42 and is less than the outer diameter of the stage 422. The second inner ring surface 448 is configured for slidably engaging with the main outer surface 421 of the sleeve 42, permitting a range of travel of the sleeve 42 through the adjusting ring 44. The resisting surface 447 of the adjusting ring 44 is configured for engaging the stage 422 of the sleeve 42. Such engagement serves to delimit the potential range of motion between the sleeve 42 and the adjusting ring 44.

The resilient member 70 advantageously is made of metal or an elastic polymer and is spiral-shaped (i.e., a coil spring). A diameter of the resilient member 70 is larger than an inner diameter of the sleeve and less than or equal to the outer diameter of the stage 422.

The bottom seat 50 is substantially cylindrical in shape and has a seat body 54. A protrusion 52 is formed on a periphery of a bottom end of the seat body 54. The protrusion 52 is ring-shaped and has a protruding surface 522, acting as a stop-limit for travel for the adjusting ring 44. A second outer screw thread 542 is formed directly on a periphery of a top end of the seat body 54. The second outer screw thread 542 is configured for engaging with the second inner screw thread 449 of the adjusting ring 44, so that the top end of the bottom seat 50 is threadingly engaged in the adjusting ring 44.

The bottom seat 50 defines a top hole 562 in the top end thereof and a bottom hole 564 in the bottom end thereof. The top hole 562 communicates with the bottom hole 564. A diameter of the top hole 562 is less than a diameter of the bottom hole 564. As such, a step surface 566 exists within the bottom seat 50 between the top hole 562 and the bottom hole 564. The step surface 566 extends inwardly and perpendicularly of the interior of the top end of the bottom seat 50, and the step surface 566 is able to bias against one end of the resilient member 70. The diameter of the top hole 562 is larger than the diameter of the outer diameter of the stage 422 of the sleeve 42.

The image sensor module 60 includes a base 62 and an image sensor 64. The image sensor 64 is secured on the base 62. The image sensor module 60 is configured for receipt in the bottom hole 564 of the bottom seat 50. The image sensor 64 transforms the image light signal into an electronic signal.

In assembly, the lens 36 is mounted in the lens barrel 31. The lens barrel 31 is threadingly mounted in the sleeve 42 with the first outer screw thread 34 of the lens barrel 31, engaging with the first inner screw thread 426 of the sleeve 42. The sleeve 42 is partially received in the adjusting ring 44 with one end of the sleeve 42 traveling through the second hole 446 of the adjusting ring 44. The resisting surface 447 of the adjusting ring 44 abuts against the stage surface 424 of the sleeve 42.

The resilient member 70 is placed in the top hole 562 of the bottom seat 50 and on the step surface 566 of the bottom seat 50. The assembled lens barrel 31, the sleeve 42, and the adjusting ring 44 are mounted to the bottom seat 50. The sleeve 42 is partially received in the top hole 562, with the stage 422 of the sleeve 42 contacting one end of the resilient member 70. The resilient member 70 is then compressed. The top end of the bottom seat 50 is threadingly received in the adjusting ring 44, with the second outer screw thread 542 of the bottom seat 50 engaging with the second inner screw thread 449 of the adjusting ring 44. The image sensing module 60 is mounted in the bottom hole 564 of the bottom seat 50. Thus, the camera module 8 is assembled, as represented in FIGS. 2-3.

Figure 2:
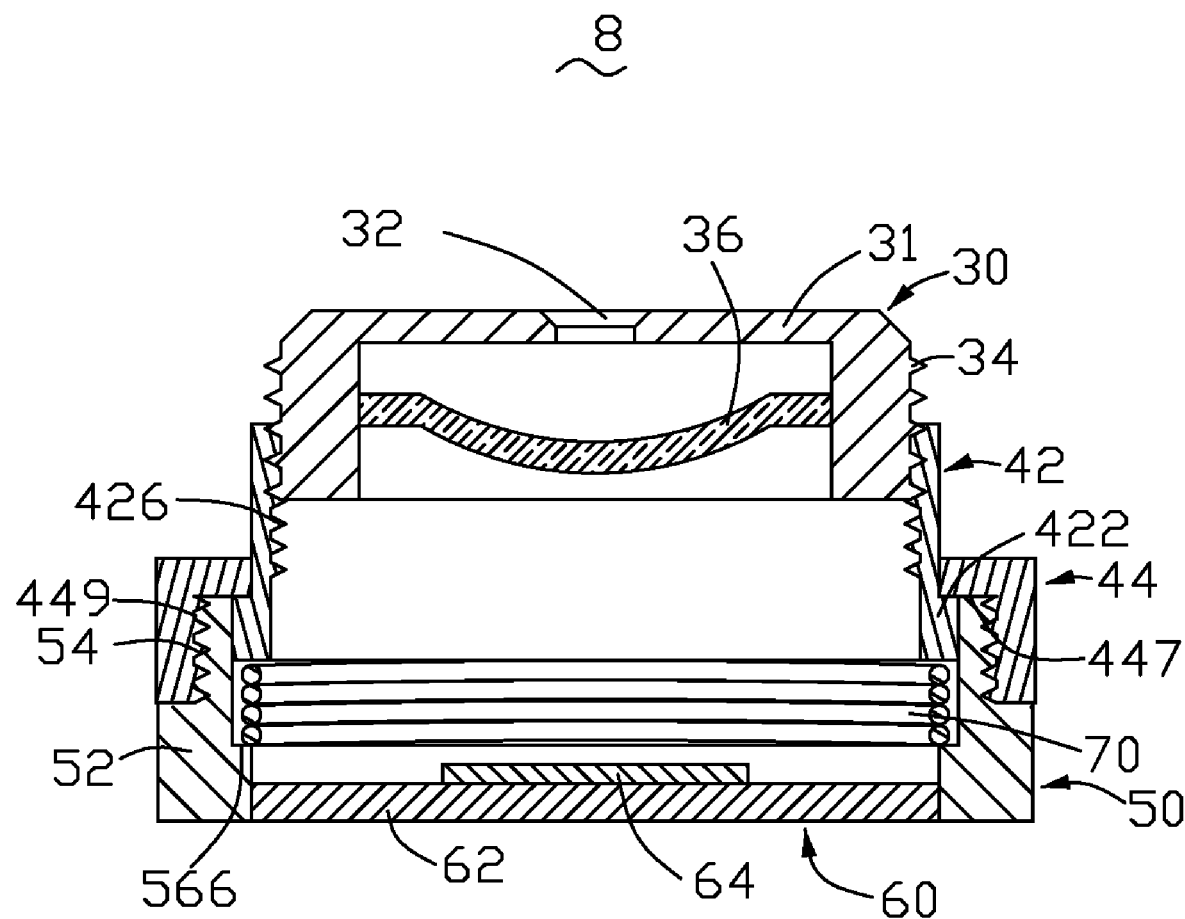
FIG. 2 is an assembled, cut-away view of the camera module in FIG. 1, with the focusing mechanism in a first state.

In use, referring to FIG. 2, when the camera module 8 is used to take photos of objects at a long distance, the focusing mechanism 40 is in a first state. In this state, one end of the adjusting ring 44 contacts the protruding surface 522 of the bottom seat 50. The resilient member 70 reaches maximum compression. Now, distance between the lens 36 and the image sensor 64 is at a minimum.

Figure 3:
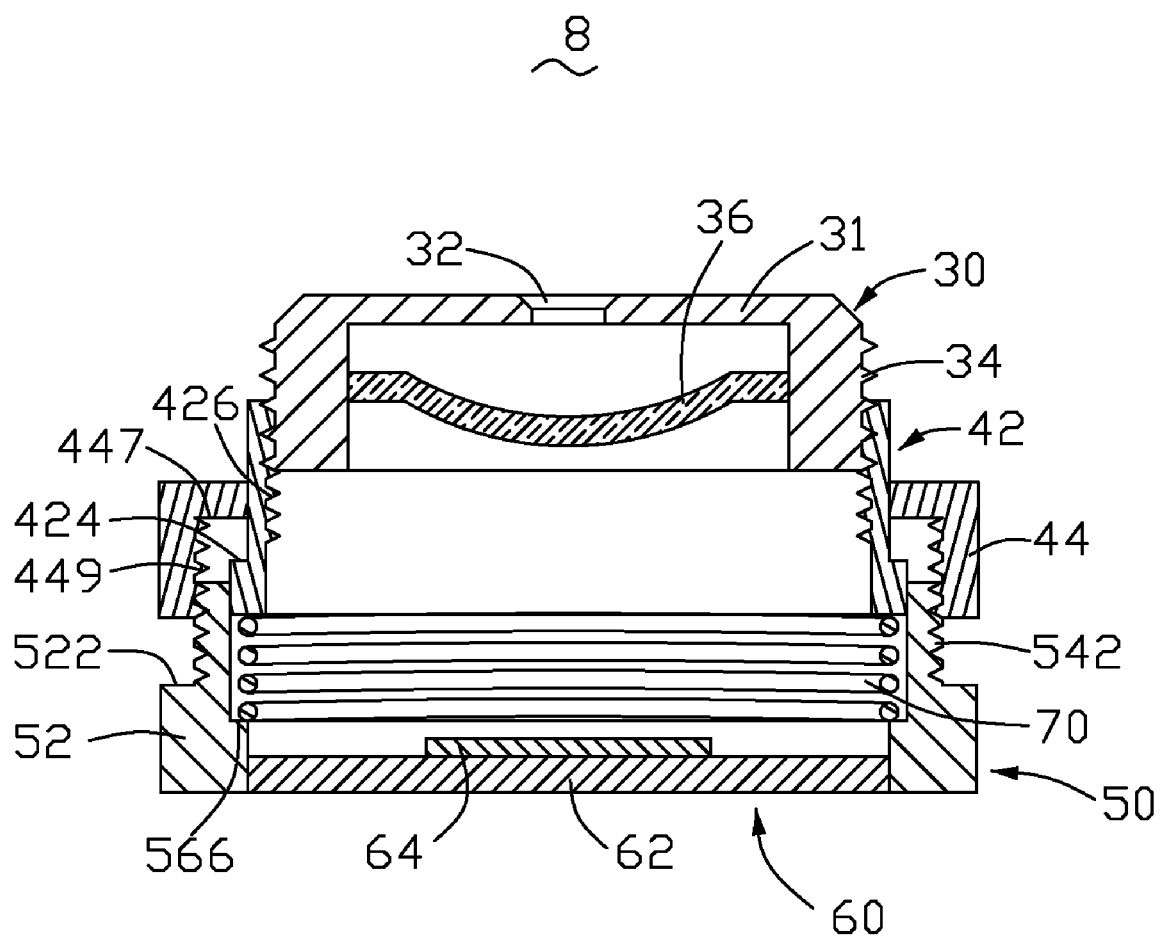
FIG. 3 is an assembled, cut-away view of the camera module in FIG. 1, with the focusing mechanism in a second state.

Further, referring to FIG. 3, when the camera module 8 is used to take photos of objects at close range, the focusing mechanism 40 is in a second state. The adjusting ring 44 is rotated manually away from the bottom seat 50. The sleeve 42 and the lens barrel 31 move away from the bottom seat 50, due to the compressed resilient member 70, until the resilient member 70 is fully expanded to its original state. Now, the distance between the lens 36 and the image sensor 64 is at a maximum. Essentially, the amount of expansion of the resilient member 70 permitted by the focusing mechanism 40 ultimately determines the degree of focus achieved. To always ensure a bias against the stage 422 and the step surface 566, it is advantageous for the maximum separation distance, for focusing purposes, between the stage 422 and the step surface 566, as permitted by screw threading, to not exceed the fully expanded length of the resilient member 70. By exceeding the fully expanded length of the resilient member 70, it would be possible for an amount of uncontrolled movement of the lens barrel 31 relative to the bottom seat to occur and thus have an adverse effect on focusing.

It is to be understood that the resilient member 70 may alternatively be made of another material (e.g., plastic or rubber). The resilient member 70 may also have a different configuration, for example, a leaf spring or a resilient cylinder, so long as the configuration does not interfere with light signals reaching the image sensor 64. The lens barrel 31 may be integrally formed with the focusing mechanism 40. Thus, the lens barrel 31 can move with the focusing mechanism 40.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module comprising:
a lens barrel having at least one lens mounted therein;
a focusing mechanism, the lens barrel being fixed to one end of the focusing mechanism and threadingly engaged in the focusing mechanism, the focusing mechanism comprising an adjusting ring and a sleeve;

a resilient member; and a bottom seat threadingly engaging with and received in the adjusting ring, one end of the resilient member resisting the focusing mechanism and the other opposite end of the resilient member resisting the bottom seat, the adjusting ring being rotated relative to the bottom seat and simultaneously sliding along the sleeve, the sliding and rotation of the adjusting ring cooperatively controlling an amount of expansion permitted within the resilient member, the sliding of the adjusting ring driven by the rotation of the adjusting ring, the amount of expansion of the resilient member determining a degree of focus achieved by the lens module.

2. The lens module as claimed in claim 1, wherein the lens barrel is partially received in the sleeve, and the sleeve is partially received in the adjusting ring.

3. The lens module as claimed in claim 2, wherein the adjusting ring is cylindrical in shape and has a first hole therein, the adjusting ring has a half-closed end, the half-closed end includes a resisting surface and a half closed end inner surface, the half-closed end inner surface defines a second hole in the adjusting ring, the half closed end inner surface is orthogonal to the resisting surface, a diameter of the second hole is less than a diameter of the first hole, and the resisting surface extends between the first hole and the second hole.

4. The lens module as claimed in claim 3, wherein the sleeve is cylindrical in shape and has a stage formed on a peripheral wall thereof, the stage has a stage surface, and the resisting surface of the adjusting ring abuts the stage surface at least when the adjusting ring is in a first position.

5. The lens module as claimed in claim 1, wherein the bottom seat has a protrusion formed on a peripheral wall thereof and the protrusion has a protruding surface configured for limiting the movement of the focusing mechanism.

6. A camera module comprising:

a lens barrel mounted with a lens therein;

a focusing mechanism, the lens barrel being fixed to one end of the focusing mechanism and threadingly engaged in the focusing mechanism, the focusing mechanism comprising an adjusting ring and a sleeve;

a resilient member;

a bottom seat threadingly engaging with and received in the adjusting ring, the other opposite end of the focusing mechanism being fixed to one end of the bottom seat, one end of the resilient member resisting the focusing mechanism and the other opposite end of the resilient member resisting the bottom seat; and an image sensing module being mounted on the other opposite end of the bottom seat, the adjusting ring being rotated relative to the bottom seat and simultaneously sliding along the sleeve, the sliding and rotation of the adjusting ring cooperatively controlling an amount of expansion permitted within the resilient member, the amount of expansion of the resilient member determining a distance between the lens and the image sensing module.

7. The camera module as claimed in claim 6, wherein the lens barrel is partially received in the sleeve, and the sleeve is partially received in the adjusting ring.

8. The camera module as claimed in claim 7, wherein the adjusting ring is cylindrical in shape and has a first hole therein, the adjusting ring has a half-closed end, the half-closed end includes a resisting surface and a half-closed end inner surface, the half-closed end inner surface defines a second hole in the adjusting ring, the half-closed end inner surface is orthogonal to the resisting surface, a diameter of the second hole is less than a diameter of the first hole, and the resisting surface extends between the first hole and the second hole.

9. The camera module as claimed in claim 8, wherein the sleeve is cylindrical in shape and has a stage formed on a peripheral wall thereof, the stage has a stage surface, and the resisting surface of the adjusting ring abuts the stage surface at least when the adjusting ring is in a first position.

10. The camera module as claimed in claim 6, wherein the bottom seat has a protrusion formed on a peripheral wall thereof and the protrusion has a protruding surface configured for limiting the movement of the focusing mechanism.

* * * * *

UNITED STATES PATENT AND TRADEMARK OFFICE
CERTIFICATE OF CORRECTION

PATENT NO. : 7,650,067 B2
APPLICATION NO. : 11/556112
DATED : January 19, 2010
INVENTOR(S) : Tsung-Wei Chiang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this

Twenty-third Day of November, 2010

David J. Kappos
*Director of the United States Patent and Trademark Office*